United States Patent
Durkin et al.

(10) Patent No.: US 11,352,063 B2
(45) Date of Patent: Jun. 7, 2022

(54) FRAME ACCESS APERTURE

(71) Applicant: Clark Equipment Company, West Fargo, ND (US)

(72) Inventors: Brent Durkin, Bismarck, ND (US); Michael J. Schmidt, Bismarck, ND (US)

(73) Assignee: CLARK EQUIPMENT COMPANY, West Fargo, ND (US)

( * ) Notice: Subject to any disclaimer, the term of this patent is extended or adjusted under 35 U.S.C. 154(b) by 119 days.

(21) Appl. No.: 16/556,810

(22) Filed: Aug. 30, 2019

(65) Prior Publication Data
US 2020/0070892 A1 Mar. 5, 2020

Related U.S. Application Data

(60) Provisional application No. 62/724,927, filed on Aug. 30, 2018.

(51) Int. Cl.
*B62D 21/18* (2006.01)
*B62D 24/02* (2006.01)

(52) U.S. Cl.
CPC .......... *B62D 21/186* (2013.01); *B62D 24/02* (2013.01); *B60Y 2200/412* (2013.01); *B60Y 2200/417* (2013.01)

(58) Field of Classification Search
CPC ...... B62D 21/186; B62D 55/10; B62D 25/24; B62D 25/184
See application file for complete search history.

(56) References Cited

U.S. PATENT DOCUMENTS

| | | | | |
|---|---|---|---|---|
| 1,247,705 A * | 11/1917 | Moore | ............ | 280/788 |
| 2,282,443 A * | 5/1942 | Wilson | ............ | B62D 25/182 |
| | | | | 280/853 |
| 5,727,881 A * | 3/1998 | Domke | ............ | B65D 77/225 |
| | | | | 383/103 |
| 5,894,908 A * | 4/1999 | Eftefield | ............ | B62D 55/10 |
| | | | | 280/781 |
| 2003/0213441 A1* | 11/2003 | Brinton | ............ | F02B 61/02 |
| | | | | 123/41.56 |
| 2006/0185874 A1* | 8/2006 | Bowman | ............ | E04H 12/003 |
| | | | | 174/45 R |
| 2007/0063547 A1* | 3/2007 | Gollehur | ............ | B62D 25/24 |
| | | | | 296/193.07 |
| 2012/0043422 A1* | 2/2012 | Campana | ............ | B64C 3/26 |
| | | | | 244/123.1 |
| 2015/0023771 A1* | 1/2015 | Carr | ............ | B66C 1/585 |
| | | | | 414/686 |

(Continued)

FOREIGN PATENT DOCUMENTS

| | | | | |
|---|---|---|---|---|
| CN | 1817692 A | * | 8/2006 | |
| EP | 2962933 B1 | * | 12/2016 | ............ B64C 1/14 |
| EP | 3254923 A1 | * | 12/2017 | ............ B61D 17/08 |

*Primary Examiner* — D Glenn Dayoan
*Assistant Examiner* — Kevin P Weldon
(74) *Attorney, Agent, or Firm* — John Veldhuis-Kroeze; Westman, Champlin & Koehler, P.A.

(57) ABSTRACT

Power machine frames, and corresponding power machines such as skid steer loaders, have fully arcuate access aperture features formed in a first frame panel providing access to a volume internal to the first frame panel or otherwise positioned interior to the frame. The fully arcuate access aperture has a fully arcuate perimeter in the first frame panel.

19 Claims, 12 Drawing Sheets

(56) References Cited

U.S. PATENT DOCUMENTS

| | | | |
|---|---|---|---|
| 2015/0198232 A1* | 7/2015 | Haines | F16H 57/031 |
| | | | 74/606 R |
| 2016/0167432 A1* | 6/2016 | Szczepanski | B60B 35/16 |
| | | | 301/137 |
| 2016/0185403 A1* | 6/2016 | Wylezinski | B62D 53/0842 |
| | | | 280/423.1 |
| 2017/0082175 A1* | 3/2017 | Chung | F16H 37/065 |
| 2020/0307717 A1* | 10/2020 | Freeman | B62D 29/02 |
| 2021/0122224 A1* | 4/2021 | Bender | B60K 17/24 |

* cited by examiner

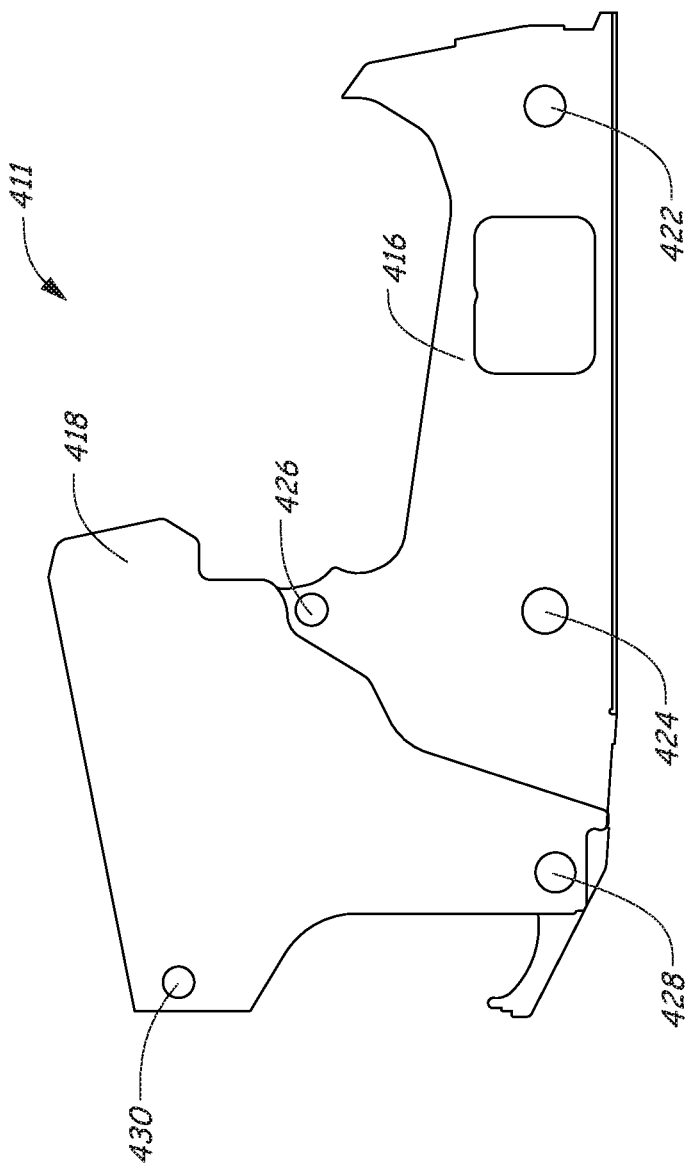

FRAME ACCESS APERTURE

CROSS-REFERENCE TO RELATED APPLICATION

This application claims the benefit of U.S. Provisional Application No. 62/724,927, which was filed on Aug. 30, 2018.

BACKGROUND

The present disclosure is directed toward power machines. More particularly, the present disclosure is related to frames of power machines such as loaders.

Power machines, for the purposes of this disclosure, include any type of machine that generates power for accomplishing a particular task or a variety of tasks. One type of power machine is a work vehicle. Work vehicles, such as loaders, are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Power machines typically include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

The frame of a power machine is coupled to the motive system, for example including wheels or track assemblies, to allow the power machine to be moved by the motive system. The motive system can include a chain case, or split chain cases, with one or more motors, sprockets and other components positioned within the chain case or interior to portions of the frame. Accessing these components typically requires an access aperture in the frame. Stresses introduced through operation of the machine can cause the frame to crack along the perimeter of the access aperture.

The discussion above is merely provided for general background information and is not intended to be used as an aid in determining the scope of the claimed subject matter.

SUMMARY

This Summary and the Abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

Disclosed embodiments include power machine frames, and corresponding power machines such as skid steer loaders, which include access aperture features providing improved access to components that are located within a chain case or otherwise positioned interior to the frame.

One general aspect of an exemplary disclosed embodiment includes a frame (110; 210; 410) for a power machine (100; 200; 400), the frame including: a first frame panel (416); an access aperture (815) formed in the first frame panel to provide access to a volume (720) internal to the first frame panel, the access aperture having a fully arcuate perimeter (824) in the first frame panel.

Implementations may include one or more of the following features. The frame where the fully arcuate perimeter is defined by perimeters of first and second intersecting ellipses (826; 828) having respective centers (827; 829) which are offset from one another. The frame where the first and second ellipses are first and second circles. The frame where the fully arcuate perimeter (824) of the access aperture (815) follows portions of the perimeters of the first and second intersecting ellipses but deviates in extended areas (832) above tops and below bottoms of the perimeters of the first and second ellipses to provide additional access aperture height. The frame where the extended areas (832) above the tops and below the bottoms of the perimeters of the first and second intersecting ellipses are aligned with the centers (827; 829) of the first and second intersecting ellipses. The frame where the fully arcuate perimeter (824) of the access aperture (815) follows portions of the perimeters of the first and second intersecting ellipses but has arcuate transition areas between the perimeters of the first and second ellipses. The frame where the arcuate transition areas (830) are formed in a lateral middle of the access aperture. The frame where the top and bottom arcuate transition areas (830) are positioned directly above and below a middle of the intersection of the perimeters of the first and second intersecting ellipses. The frame where the top and bottom transition areas (830) provide a continuously curved transition between the perimeters of the first and second intersecting ellipses instead of a sharp edge transition. The frame and further including a cover (820) configured to be removably secured to the first frame panel to provide access through the access aperture. The frame where the frame further includes a chain case (720), and where the volume internal to the first frame panel includes the chain case. The frame where the frame further includes a drive motor mount (808) and where the area internal to the first frame panel includes an area around the drive motor mount.

One general aspect of another exemplary disclosed embodiment includes a power machine (100; 200; 400) including: a power source (120; 220); a traction system (140; 240) powered by the power source; and a frame (110; 210; 410) supporting the power source and the traction system, the frame having a first frame panel (416) with a fully arcuate access aperture (815) formed therein to provide access to a volume (720) internal to the first frame panel.

Implementations may include one or more of the following features. The power machine where the access aperture has a perimeter (824) substantially defined by a perimeter of at least one ellipse (826; 828). The perimeter (824) substantially defined by first and second intersecting ellipses (826; 828). The first and second intersecting ellipses being first and second intersecting ellipses having respective centers (827; 829) which are offset from one another. The power machine where the perimeter (824) of the fully arcuate access aperture (815) follows portions of the perimeters of the first and second intersecting ellipses at opposing sides of the access aperture, but deviates in arcuate extended areas (832) above tops and below bottoms of the perimeters of the first and second ellipses to provide additional access aperture height. The power machine where the extended areas (832) above the tops and below the bottoms of the perimeters of the first and second intersecting ellipses are aligned with the centers (827; 829) of the first and second intersecting ellipses. The power machine where the fully arcuate perimeter (824) of the access aperture (815) substantially follows the perimeters of the first and second intersecting ellipses but deviates in top and bottom arcuate transition areas (830) in a lateral middle of the access aperture. The power machine where the top and bottom transition areas (830) are positioned directly above and below a middle of the intersection of the perimeters of the first and second intersecting ellipses. The power machine where the top and bottom transition areas (830) provide a continuously curved transition between the perimeters of the first and second intersecting ellipses instead of a sharp edge transition defined by the intersection of the first and second intersecting ellipses. The power machine and further including a cover (820) configured to be removably secured to the first frame panel to provide access through the access aperture. The power machine where the frame further includes a chain case (720), and where the volume internal to the first frame panel includes the chain case. The power machine where the frame further includes a drive motor mount (808) and where the volume internal to the first frame panel includes an area around the drive motor mount.

BRIEF DESCRIPTION OF THE DRAWINGS

FIGS. 4-4A are side view illustrations of a power machine frame in accordance with an exemplary embodiment.

FIGS. 5-1 through 5-4 are perspective and top view illustrations of a portion of the power machine frame, and further illustrating a cast axle tube support for an axle tube extending from a split chain case housing within the frame.

FIGS. 7-1 through 7-4 are perspective and side view illustrations of an access aperture portion of a frame side panel in accordance with exemplary embodiments.

DETAILED DESCRIPTION

The concepts disclosed in this disclosure are described and illustrated with reference to exemplary or illustrative embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as including, comprising, having, and variations thereof as used herein are meant to encompass the items listed thereafter, equivalents thereof, as well as additional items.

Disclosed embodiments are directed to power machine frame, and corresponding power machines such as skid steer loaders. The power machine frames include improved access aperture configurations that provide access to a chain case and components therein via a side panel of the frame. The access aperture configurations provide increased strength in comparison to generally rectangular access aperture configurations, and provide increased access area in comparison to purely circular access aperture configurations. Disclosed access aperture configurations provide these advantages using a modified shape based upon intersecting circles.

Figure 2:
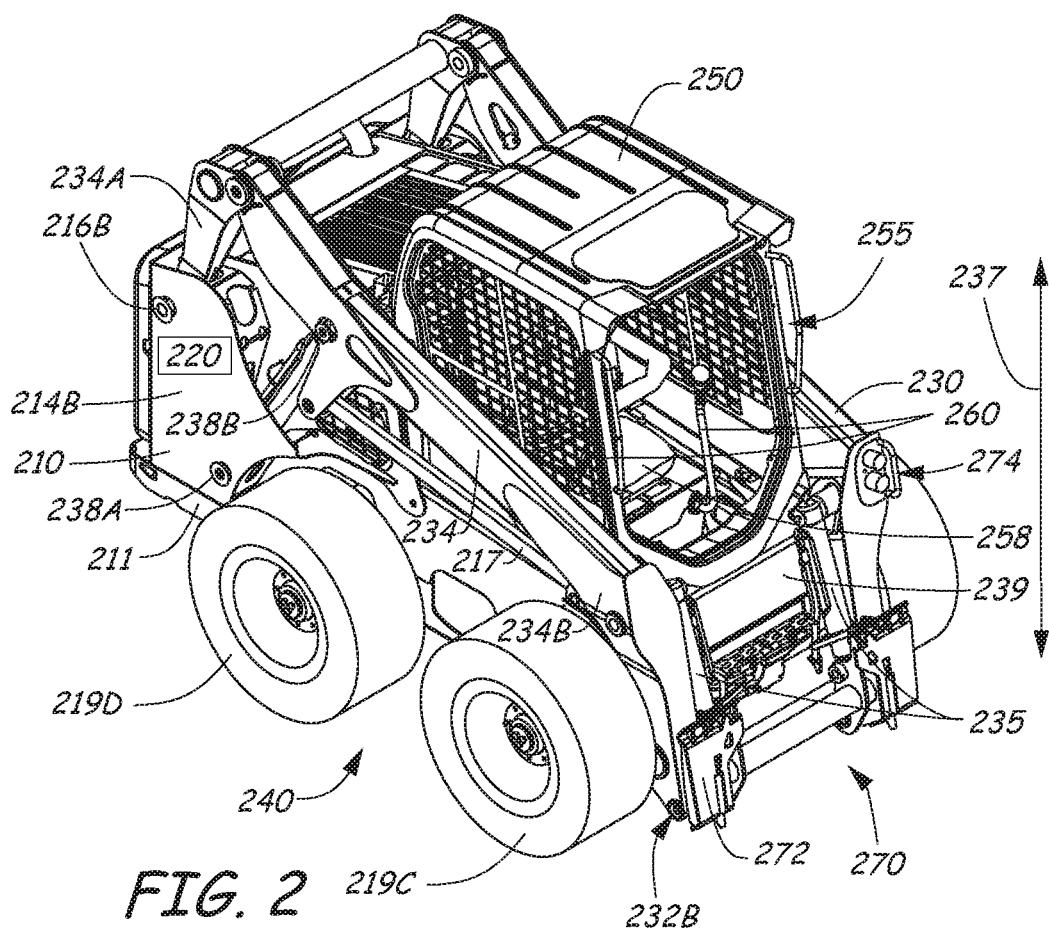
FIG. 2 is a front perspective view of a power machine of the type on which embodiments disclosed herein can be advantageously practiced.
Figure 3:
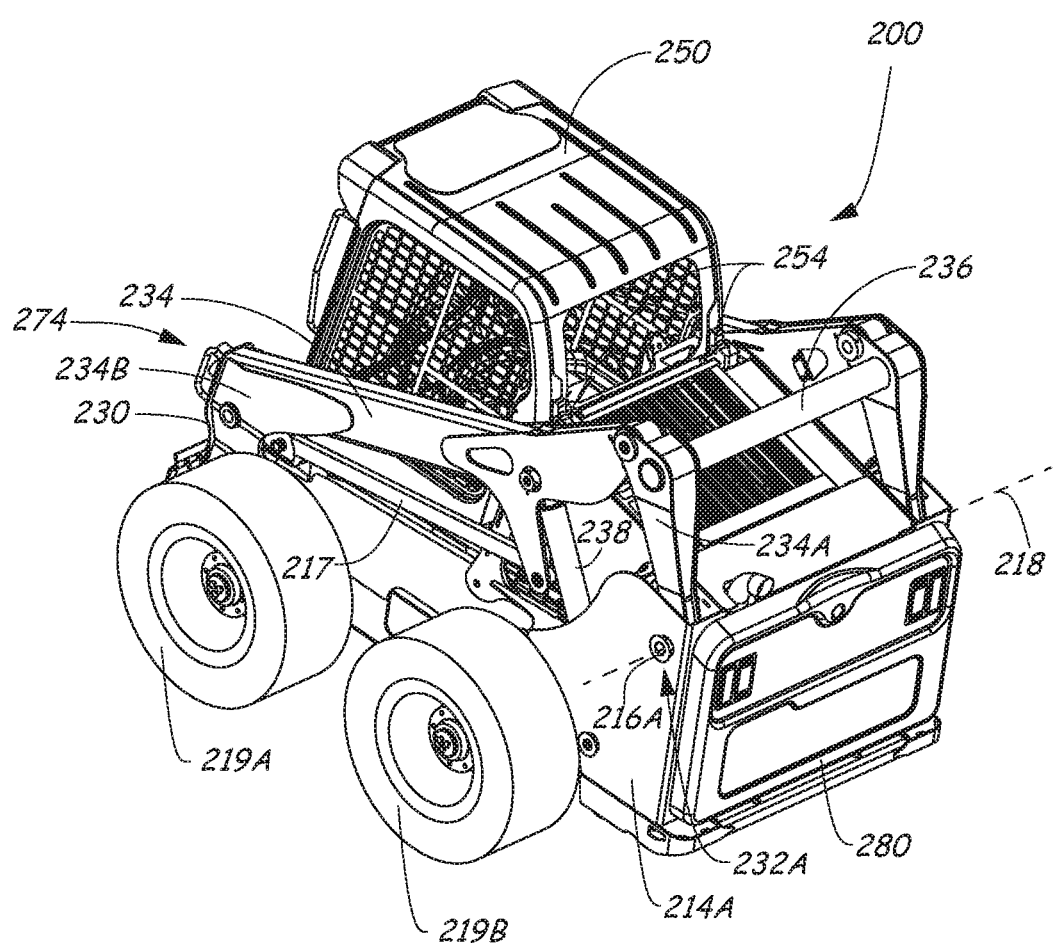
FIG. 3 is a rear perspective view of the power machine shown in FIG. 2.

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. However, as mentioned above, the embodiments below can be practiced on any of a number of power machines, including power machines of different types from the representative power machine shown in FIGS. 2-3.

Power machines, for the purposes of this disclosure, include a frame, at least one work element, and a power source that is capable of providing power to the work element to accomplish a work task. One type of power machine is a self-propelled work vehicle. Self-propelled work vehicles are a class of power machines that include a frame, work element, and a power source that is capable of providing power to the work element. At least one of the work elements is a motive system for moving the power machine under power.

Figure 1:
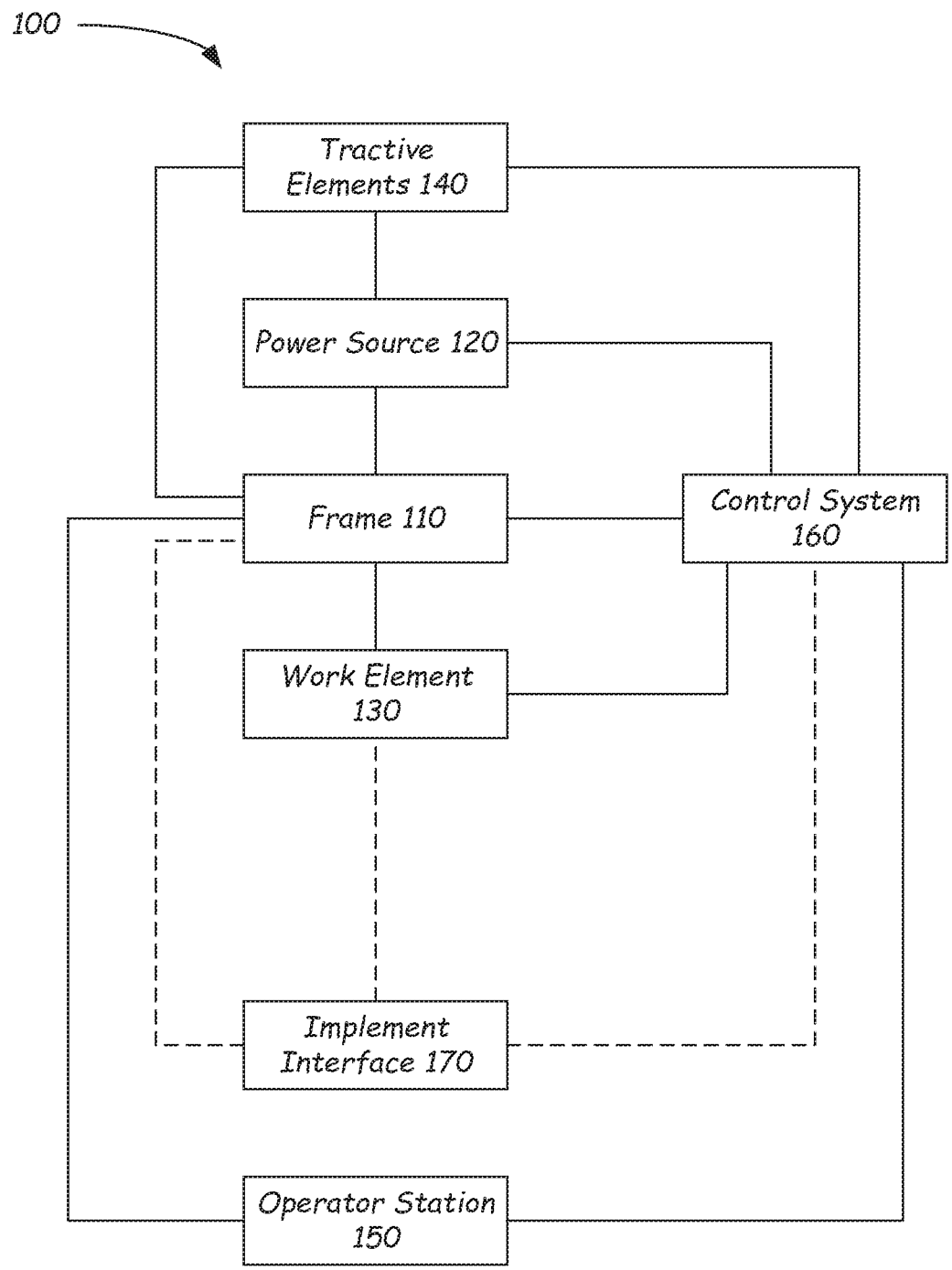
FIG. 1 is a block diagram illustrating functional systems of a representative power machine on which embodiments of the present disclosure can be advantageously practiced.

FIG. 1 shows a block diagram illustrating the basic systems of a power machine 100 upon which the embodiments discussed below can be advantageously incorporated and can be any of several different types of power machines. The block diagram of FIG. 1 identifies various systems on power machine 100 and the relationship between various components and systems. As mentioned above, at the most basic level, power machines for the purposes of this disclosure include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that are capable of performing a dedicated task. For example, some work vehicles have a lift arm to which an implement such as a bucket is attached such as by a pinning arrangement. The work element, i.e., the lift arm can be manipulated to position the implement for the purpose of performing the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of various different implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work elements with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that is capable of moving with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is capable of providing power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that are capable of using it to perform a work function. Power sources for power machines typically include an engine such as an internal combustion engine and a power conversion system such as a mechanical transmission or a hydraulic system that can convert the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e. from a remotely located operator station) instead of or in addition to an operator station adjacent or on the power machine. This can include applications where at least some of the operator-controlled functions of the power machine can be operated from an operating position associated with an implement that is coupled to the power machine. Alternatively, with some power machines, a remote-control device can be provided (i.e. remote from both the power machine and any implement to which it is coupled) that can control at least some of the operator-controlled functions on the power machine.

FIGS. 2-3 illustrates a loader 200, which is one example of the power machine 100 illustrated in FIG. 1 where the embodiments discussed below can be advantageously employed. Loader 200 is a skid-steer, which is a loader that has tractive elements (in this case, four wheels) that are mounted to the frame of the loader via rigid axles. Here the phrase "rigid axles" refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this disclosure, unless noted otherwise, the term skid-steer should not be seen as limiting the scope of the disclosure to those loaders with wheels as tractive elements.

Loader 200 is one example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Track loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all the concepts discussed below can be practiced on many other types of work vehicles such as various other loaders, excavators, trenchers, and dozers, to name but a few examples.

Loader 200 includes frame 210 that supports a power system 220 that can generate or otherwise providing power for operating various functions on the power machine. Power system 220 is shown in block diagram form, but is located within the frame 210. Frame 210 also supports a work element in the form of a lift arm assembly 230 that is powered by the power system 220 for performing various work tasks. As loader 200 is a work vehicle, frame 210 also supports a traction system 240, powered by power system 220 for propelling the power machine over a support surface. The power system 220 is accessible from the rear of the machine. A tailgate 280 covers an opening (not shown) that allows access to the power system 220 when the tailgate is an opened position. The lift arm assembly 230 in turn supports an implement interface 270 that provides attachment structures for coupling implements to the lift arm assembly.

Frame 210 of loader 200 includes an undercarriage or lower portion 211 of the frame and a mainframe or upper portion 212 of the frame that is supported by the undercarriage. The mainframe 212 of loader 200 is attached to the undercarriage 211 such as with fasteners or by welding the undercarriage to the mainframe. Mainframe 212 includes a pair of upright portions 214A and 214B located on either side and toward the rear of the mainframe that support lift arm structure 230 and to which the lift arm structure 230 is pivotally attached. The lift arm structure 230 is illustratively pinned to each of the upright portions 214A and 214B. The combination of mounting features on the upright portions 214A and 214B and the lift arm structure 230 and mounting hardware (including pins used to pin the lift arm structure to the mainframe 212) are collectively referred to as joints 216A and 216B (one is located on each of the upright portions 214) for the purposes of this disclosure. Joints 216A and 216B are aligned along an axis 218 so that the lift arm structure is capable of pivoting, as discussed below, with respect to the frame 210 about axis 218. Other power machines may not include upright portions on either side of the frame, or may not have a lift arm structure that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports tractive elements in the form of wheels 219A-D (collectively, 219) on either side of the loader 200.

Various power machines that can include and/or interacting with the embodiments discussed below can have various different frame components that support various work elements. Frame 210 illustrated in FIGS. 2 and 3 is illustrative of a power machine frame. However, power machine frames and components discussed below with reference to FIGS. 5-17 differ in some respects with features shown in frame 210. Those of skill in the art will recognize that other embodiments of frame 210 and power machine 200 include some or all frame features as described in FIGS. 5-17.

Returning to FIGS. 2-3, the loader 200 includes a cab 250 that defines an operator station 255 from which an operator can manipulate various control devices 260 to cause the power machine to perform various work functions. Cab 250 can be pivoted back about an axis that extends through mounts 254 to provide access to power system components as needed for maintenance and repair. The operator station 255 includes an operator seat 258 and a plurality of operation input devices, including control levers 260 that an operator can manipulate to control various machine functions. Operator input devices can include buttons, switches, levers, sliders, pedals, and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 100 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

The lift arm assembly 230 shown in FIGS. 2-3 is one example of many different types of lift arm assemblies that can be attached to a power machine such as loader 200 or other power machines on which embodiments of the present disclosure can be practiced. The lift arm assembly 230 is what is known as a vertical lift arm, meaning that the lift arm assembly 230 is moveable (i.e. the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this disclosure are limited by the type or number of lift arm assemblies that are coupled to a particular power machine.

The lift arm assembly 230 has a pair of lift arms 234 that are disposed on opposing sides of the frame 210. A first end of each of the lift arms 234 is pivotally coupled to the power machine at joints 216 and a second end 234B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e. along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

Implement interface 270 is located proximal to a second end 232B of the lift arm assembly 234. The implement interface 270 includes an implement carrier 272 that can accept and securing a variety of different implements to the lift arm 230. Such implements have a complementary machine interface that is configured to be engaged with the implement carrier 272. The implement carrier 272 is pivotally mounted at the second end 232B of the arm 234. Implement carrier actuators 235 are operably coupled the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the excavator 200 to allow communication between a controller on an implement and electronic devices on the loader 200.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Figure 4:
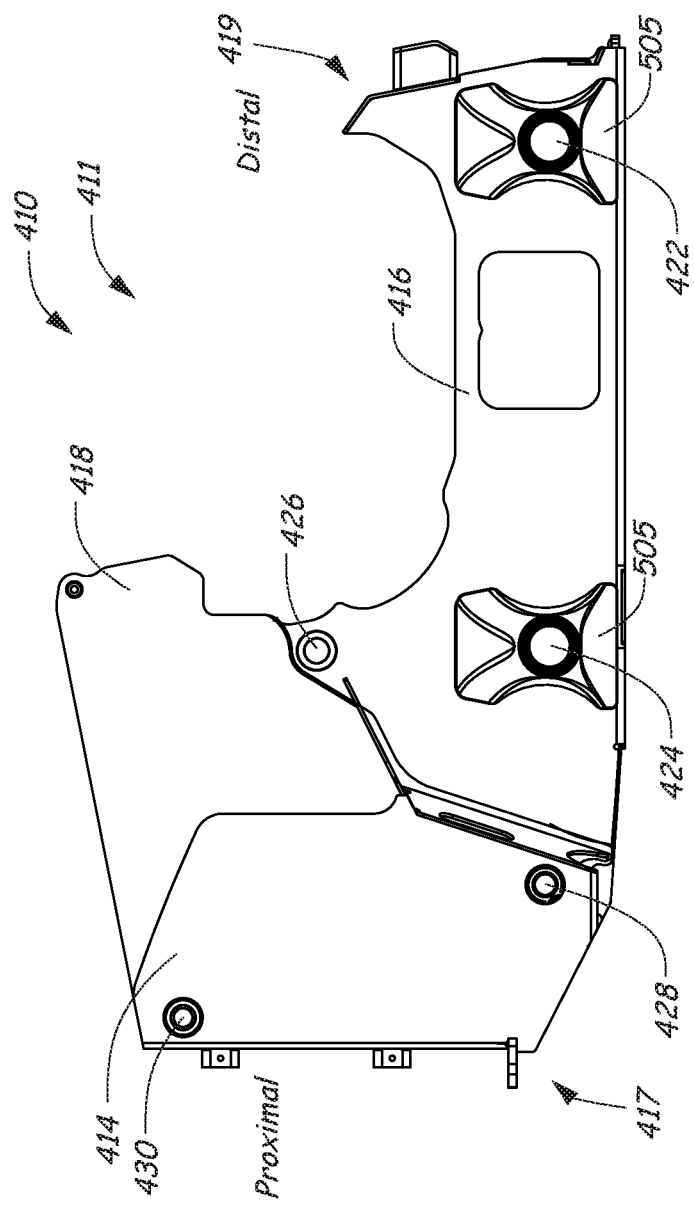

FIG. 4 is a side view illustration of a portion 411 of a frame 410 for a power machine 400 such as the power machines that are discussed above and shown in FIGS. 1-3. While frame 410 is particularly configured as a frame of a wheeled skid-steer loader such as shown in FIGS. 2-3, some features of frame 410 can be used in other loader types such as a tracked skid-steer loaders or other loaders. The portion 411 of frame 410 shown in FIG. 4 corresponds generally to a right side of a loader frame such as is shown FIGS. 2-3 and FIG. 4 is view from a right-hand side of the portion 411 of frame 410. Frame 410 also includes a left-hand side (not shown in FIG. 4) that is a substantially similar but mirror image or near mirror-image of the right-hand side.

Frame portion 411 includes two primary panels, first panel 416 that extends generally horizontally from a proximal end 417 toward a distal end 419 and a second panel 418 that is positioned generally toward the proximal end 417 and extends generally vertically. As will be discussed in more detail below, the first panel 416 and the second panel 418 are attached to each other and are generally planar to each other. Frame portion 411 also includes an outer upright portion 414 that is positioned toward the proximal end 417 and is spaced outboard of the first and second panels 416 and 418 to create a pocket in which connections to a lift arm and lift arm actuator are operably coupled to the frame 410.

To improve the manufacturability and dimensional consistency of the frame 410 of power machine 400, first panel 416 includes two axle apertures 422 and 424 establishing the wheel base of the power machine, and at least one lift arm position indexing aperture 426 formed in the panel such as by laser cutting the apertures into the panel. By having these apertures in a unitary piece of material as opposed to in different pieces of material that are fastened together such as by welding, the relative position of each axle location and a lift arm location are capable of being held in a tighter tolerance than might be achieved when such apertures are formed into separate pieces of material that are welded together. More particularly, panel 416 includes two lift arm position indexing apertures 426 and 428 (best seen in FIG. 5). Apertures 422, 424, 426 and 428 can be, for example, laser cut or otherwise formed into single panel 416 to very closely control alignment and tolerances. In some exemplary embodiments, lift arm position indexing aperture 426 is a driver or control link pivot aperture, while aperture 428 is a lift cylinder aperture. By having first and second axle apertures 422 and 424, and at least one lift arm position indexing aperture 426 formed, for example by laser cutting, into a single panel 416 of frame 410, alignment of corresponding components during the manufacturing or assembly process can be improved and simplified. Also shown in FIG. 4, panel 416 includes an access aperture 415 for providing access to a motor, sprocket and/or other components within a split chain case or positioned interior to panel 416. Particularly advantageous access aperture shapes and configurations, different from that of access aperture 415 shown in FIG. 4, are discussed below with reference to FIGS. 7-1 through 7-4.

Referring still to FIG. 4, second panel 418 of the side wall or upright portions 414 can also include lift arm position indexing apertures 428 and 430 for use in rotatably coupling lift arm follower link pivots, lift cylinder pivots, etc. Further, in some embodiments, apertures can be formed in both of panels 416 and 418 such that the apertures align when the two panels are welded together. For example, aperture 428 is illustrated in both of panels 416 and 418. Likewise, in some alternative embodiments, aperture 426 can be formed in both of panels 416 and 418 as well. Also shown in FIG. 4 are axle tube supports 505 surrounding axle apertures 422 and 424. Axle tube supports 505 are used to support axle tubes in a split chain case design discussed below in greater detail. Axle tube supports 505 in some embodiments are formed by casting, but in other embodiments can be formed using other techniques including welding multiple parts together. FIG. 4A shows side panels 416 and 418 without any other components. In this embodiment, panel 418 is welded to panel 416 and is positioned outboard of the panel 416.

Figures 1, 5:
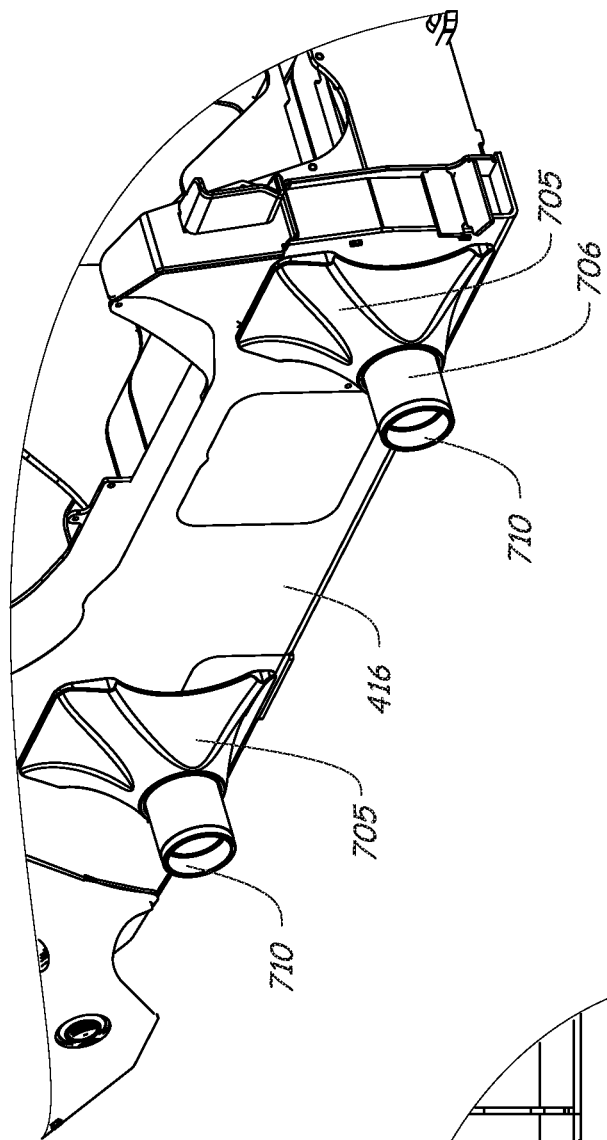
Figures 2, 5:
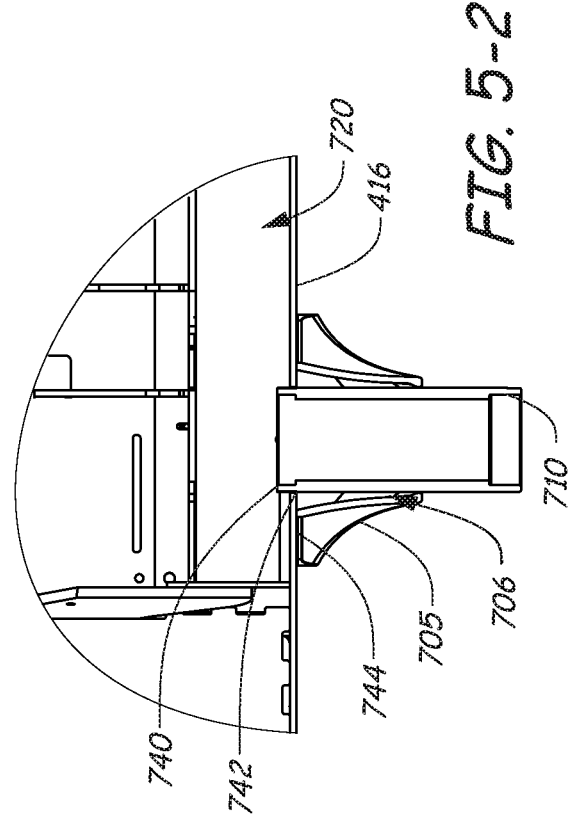
Figures 3, 5:
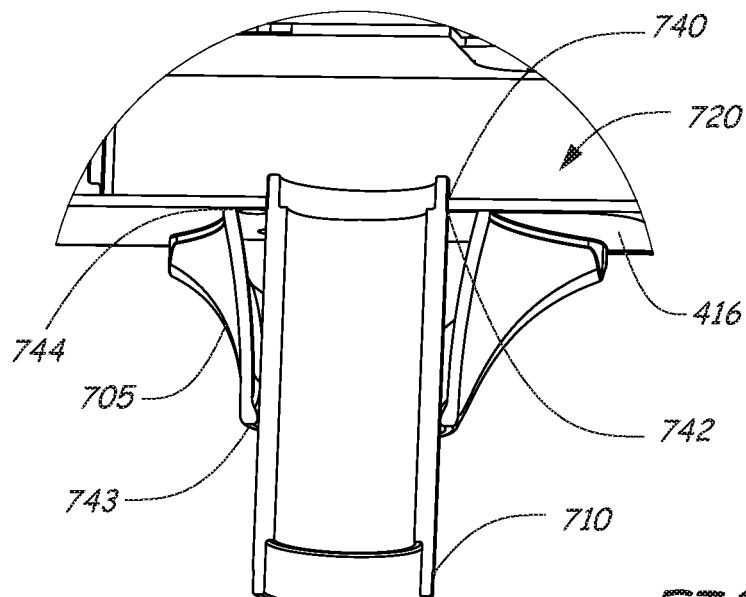
Figures 4, 5:
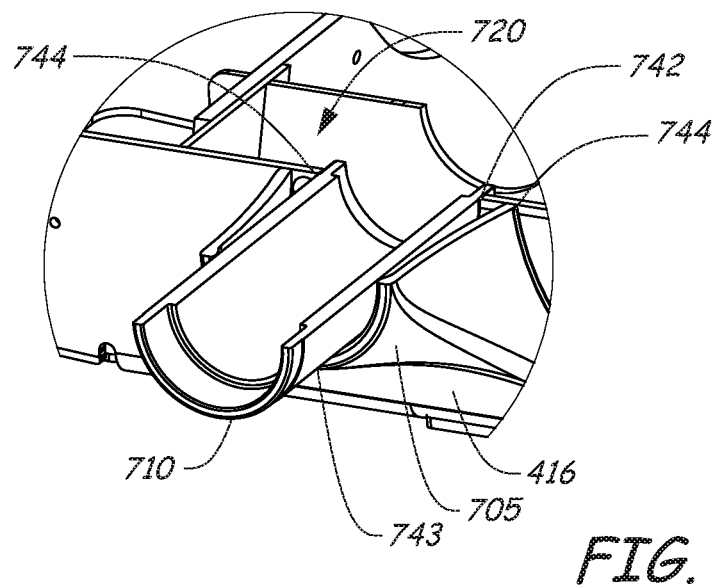
Figure 6:
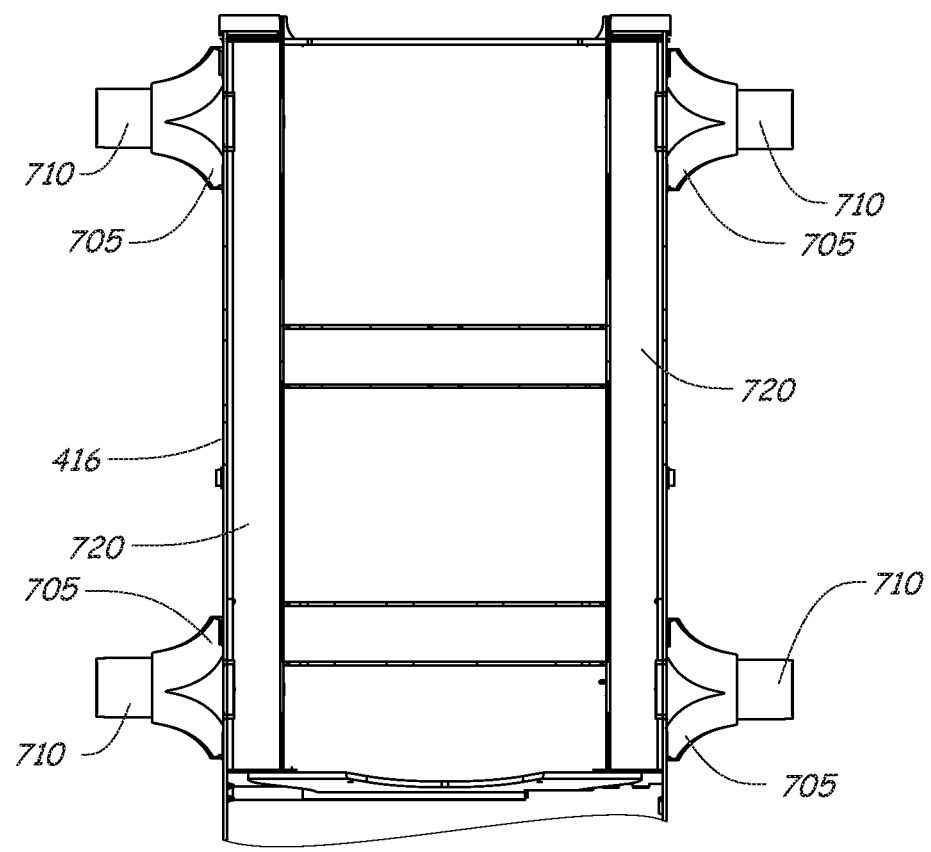
FIG. 6 is a top view of a portion of the power machine frame.

FIGS. 5-1 through 5-4 illustrate perspective and top views of portions of frame 410 illustrating features of some exemplary embodiments in which cast axle tube supports 705 are welded to portions of panel 416 that form an outer chain case wall of a chain case 720 on both sides of the frame in a split chain case design. Skid steer loaders typically have a single drive motor coupled to both axles on each side of the frame. Each drive motor is typically coupled to the axles by chains that are driven by sprockets directly coupled to an output shaft of the drive motor. Various sprocket and chain arrangements can be used and are not shown here because the specific chain drive arrangement that might be used in a given embodiment is not germane to the disclosure. Some skid steer loaders have a single chain case in which the chain drives for each side of the loader are contained. In the embodiments shown herein, chain cases 720 are located on each side (hence the use of the split chain case nomenclature referred to above) of the frame 410. The cast axle tube support 705 has an aperture 706 through which an axle tube 710 extends. FIGS. 5-2 through 5-4 illustrate portions of the axle tubes, the axle tube supports, and the split chain cases. During manufacture of frame 410, axle tube 710 can be welded to either an inside surface 740 of panel 416 (e.g., an inner surface of the outer wall of chain case 720) or to an outside surface 742 of panel 416. Axle tube 710 can also be welded to support 705 at aperture 706. Support 705 is welded to an outside surface 744 of panel 416. Using cast axle tube supports 705 welded to panel 416 over apertures 422 and 424 discussed above with reference to FIG. 4 provides support for axles 710. By having supports 705 welded to the frame, the axles are positively mounted and cannot be moved. This arrangement advantageously provides a positive positioning of the axle tubes 710 over prior art designs that allow for adjustment—and possible misadjustment—of the axle tubes on machines with split chain cases. FIG. 6 is a top view of a portion of frame 410 illustrating the axle tube support features discussed above.

Figures 1, 7:
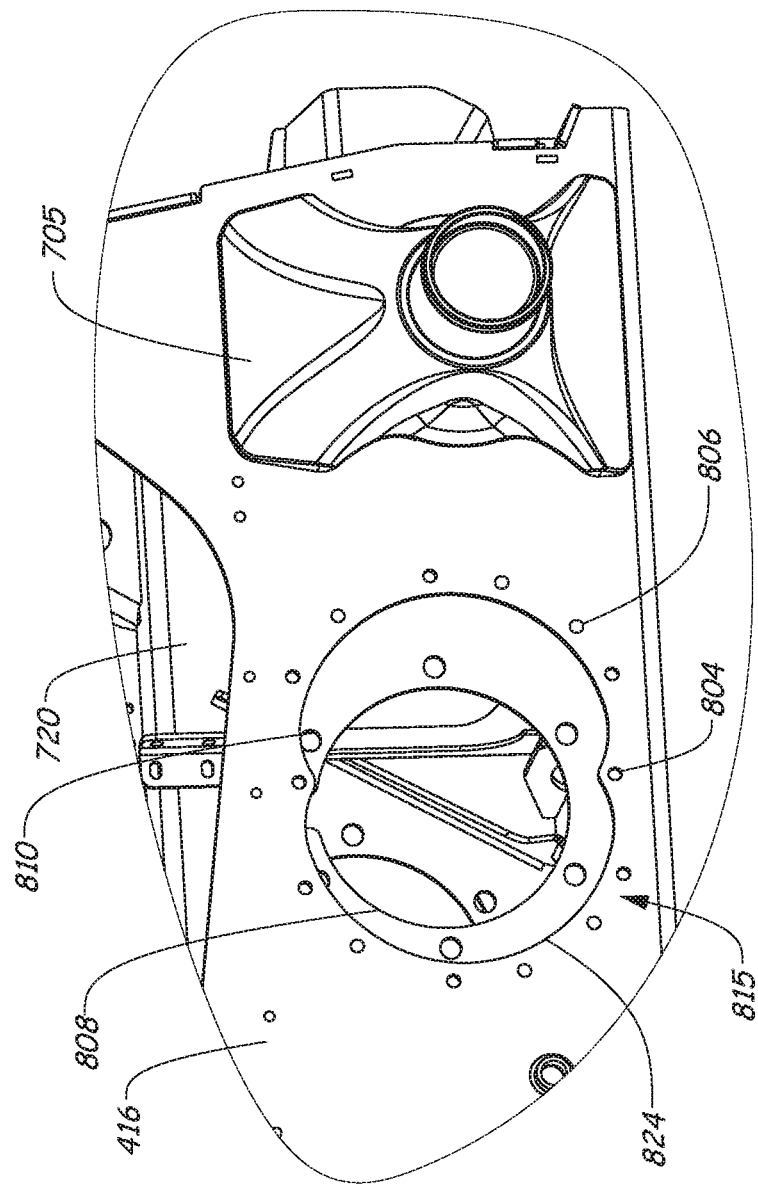
Figures 2, 7:
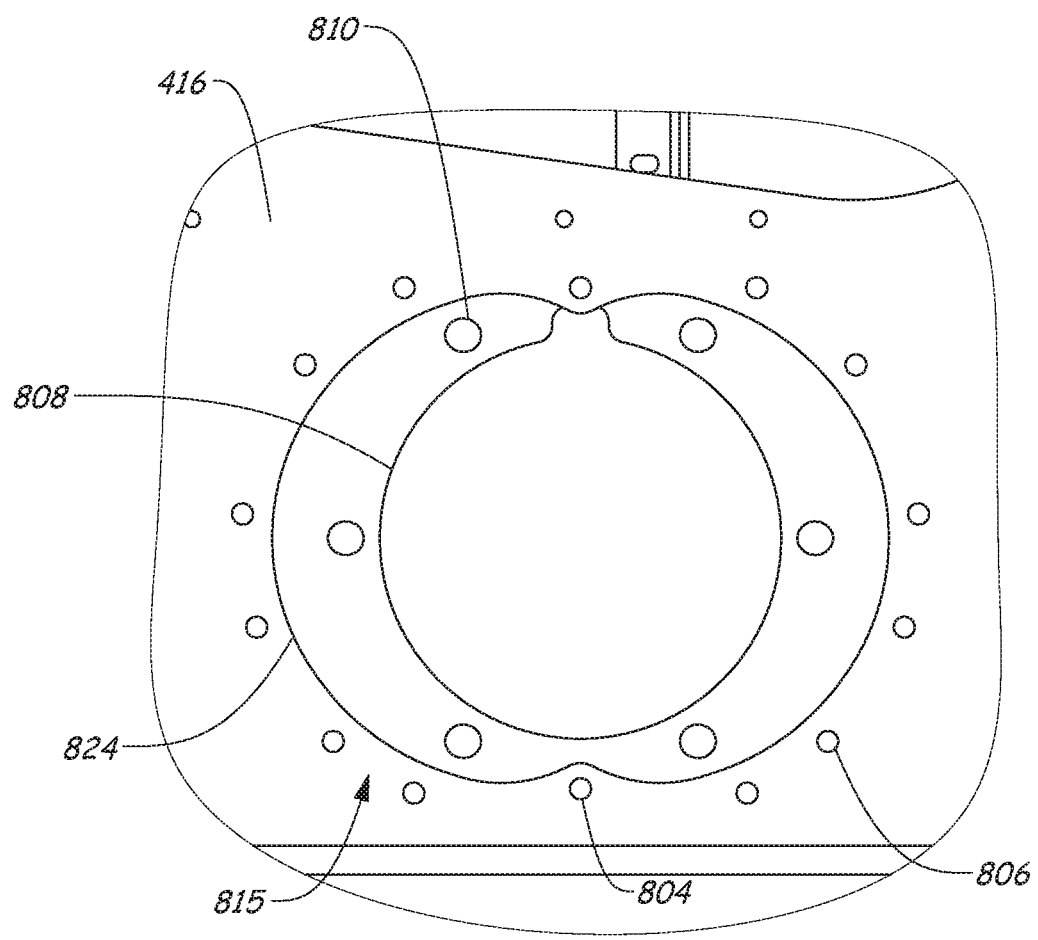
Figures 3, 7:
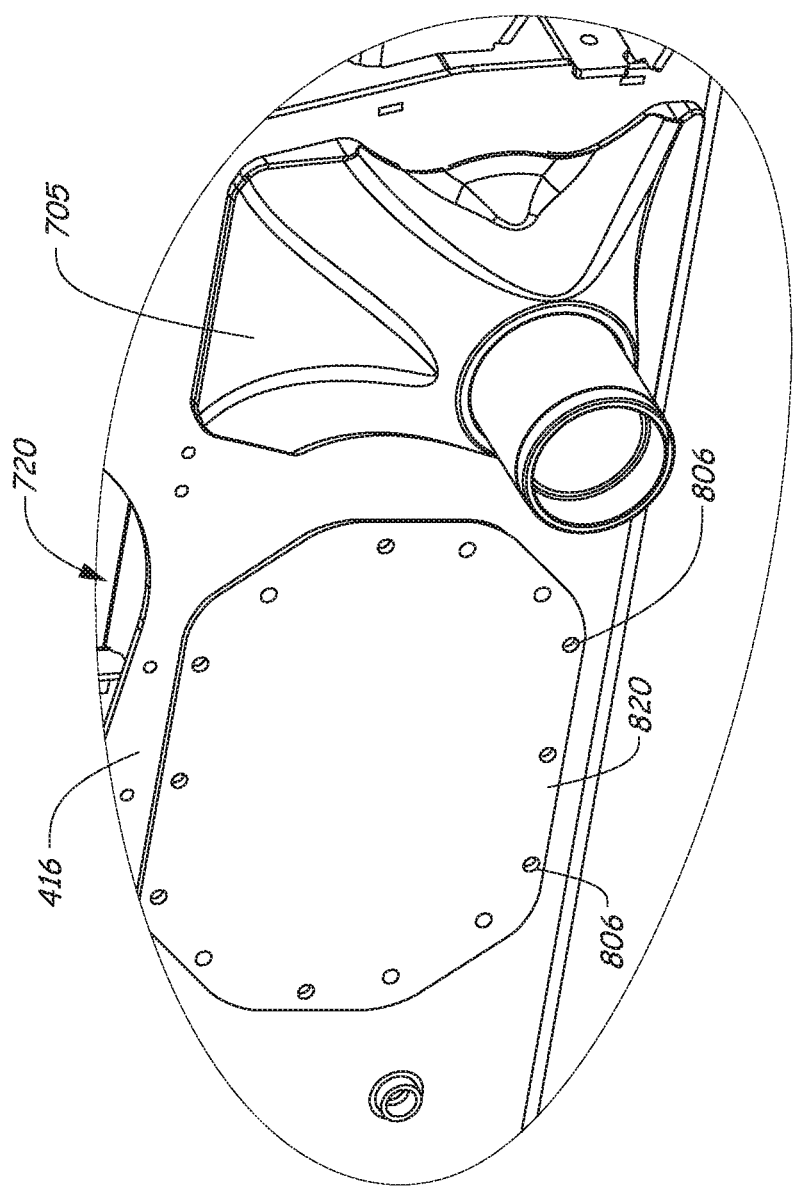
Figures 4, 7:
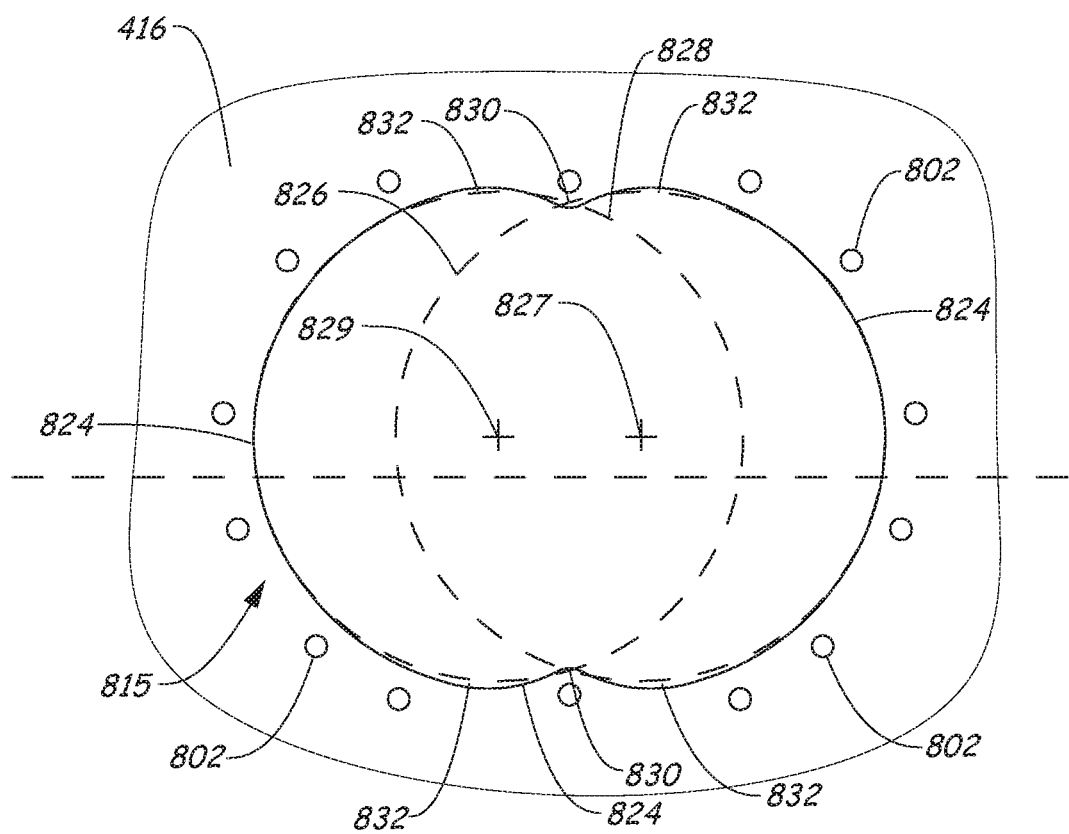

Referring now to FIGS. 7-1 through 7-4, shown is panel 416 of frame 410 with an alternate exemplary embodiment of an access aperture 815 for accessing a drive motor assembly (not shown) mounted in a mount aperture 808 using carrier bolts or fasteners (not shown) in bolt apertures 810, and for accessing a sprocket (not shown) or other components within chain case 720 or interior to panel 416. The access aperture 815 has a shape which prevents cracking and similar damage which may occur with a generally rectangular shaped access aperture that has relatively squared corners, even if the corners are rounded some, while providing increased access area relative to regular circular shaped access apertures. In exemplary embodiments, the access aperture 815 is a fully arcuate access aperture, having a fully arcuate perimeter. The fully arcuate perimeter has, in exemplary embodiments, no straight edges and has no sharp transitions between arcuate segments of the perimeter. Circular shaped access apertures provide more strength to the boundary areas of the access aperture as compared to rectangular access apertures because stresses are more uniformly distributed around a circular aperture, and therefore will experience less cracking or material failure. However, for the limited height available in panel 416, a simple circle access aperture does not provide a wide enough access area because there must be sufficient material at the top and bottom of the access aperture to allow for fasteners that are positioned at a top and bottom of the access aperture as well as sufficient material for structural integrity. The access aperture area must be wide enough to access components, such as a sprocket. Horizontally oriented ellipse or oval shaped access apertures could increase the width of the access area, in comparison to a circular access aperture, while maintaining some of the stress distribution benefits of the circular shaped access area. However, the increase in access area of the aperture may not be sufficient, as the height of the end portions of the oval may not be sufficient. Further, the decrease in strength of an oval shaped access aperture relative to a circular access aperture may result in cracking or material failure.

The disclosed embodiments of access aperture 815 provide the benefits of a circular shaped access aperture, with a significantly increased access aperture area to allow for improved access to components within chain case 720 or generally interior to panel 416. As discussed further with reference to FIG. 7-4, access aperture 815 has a fully arcuate perimeter 824. The fully arcuate perimeter 824 can be defined by two intersecting ellipses (with a circle being an ellipse with both focal points in the same spot) or other arcuate shapes, with modifications to the perimeter 824 to provide arcuate transitions to strengthen areas above and below the intersecting portions of the ellipses or circles, and with modifications to the perimeter 824 to increase the access aperture area above the tops of the ellipses or circles and below the bottoms of the ellipses or circles. This can increase accessibility beyond the circular shape for example to improve access to fasteners that are inserted into apertures 810 to hold a drive motor assembly in place. In some embodiments, the two intersecting arcuate shapes are the same size. Alternatively, two (or more) arcuate shapes of differing sizes can be used to define the perimeter of the access aperture.

In some embodiments, panel 416 includes fastener apertures 802 (shown in FIG. 7-4) positioned around a perimeter of access aperture 815 and configured to receive threaded fastener studs 804 (shown in FIGS. 7-1 and 7-2) onto which nuts 806 (shown in FIGS. 7-1 through 7-3) can be threaded to secure a cover 820 (shown in FIG. 7-3). Cover 820 is omitted from FIGS. 7-1, 7-2 and 7-4 to better illustrate features of access aperture 815.

Referring now more specifically to FIG. 7-4, shown in greater detail is access aperture 815 in panel 416. Perimeter 824 of access aperture 815 is largely defined by two intersecting ellipses or circles, a first ellipses 826 (a circle in this embodiment) having a center 827 and a second ellipses 828 (a circle in this embodiment) having a center 829. However, the shape of perimeter 824 departs from the path of ellipses 826 and 828 in several areas to strengthen the panel 416 and/or to increase the height of the access areas at the tops and bottoms of the ellipses (areas of perimeter 824 directly above and below centers 827 and 829). For example, in areas 830 directly above and below the middle of the intersection of the two ellipses, fully arcuate perimeter 824 is rounded instead of transitioning between the paths of the circles with a sharp transition or edge. This provides increased strength over an access aperture with a sharp edge in areas 830. Also, in areas 832 at the top center and bottom center of each of ellipses 826 and 828, the perimeter 824 extends above/below the path of the ellipses, while maintaining a smooth curvature. By extending perimeter 824 in areas 832, additional height can be provided to allow better access to the motor, sprocket, or other components within chain case 720 or otherwise interior to panel 416.

Generally, the fully arcuate access aperture with a fully arcuate perimeter can be formed using a series of arcuate segments without straight edges and without sharp transitions between segments. As a practical matter, computer modeling may create very small (less than about one millimeter) flat areas, but the relative impreciseness of forming apertures in a flat metal plate will result in no flat areas in the perimeter. In embodiments which are substantially defined by two intersecting ellipses, such as two intersecting circles in some embodiments, the phrase substantially defined by refers to the perimeter of the access aperture generally following segments of the perimeters of the intersecting ellipses, but allowing for deviations from the perimeters of the intersecting ellipses to expand the size of the access aperture or to reduce stress concentration along the perimeter of the access aperture to reduce the likelihood of the material around the perimeter from cracking by providing smooth or arcuate transitions between different segments of the perimeter. These deviations are formed using arcuate segments and without straight edges in access aperture perimeter.

Although the present invention has been described by referring to preferred embodiments, workers skilled in the art will recognize that changes may be made in form and detail without departing from the spirit and scope of the invention.

What is claimed is:

1. A frame for a power machine, the frame comprising:
a first generally planar frame panel;
an access aperture formed in the first generally planar frame panel to provide access to a volume internal to the first frame panel, the access aperture having a fully arcuate perimeter in the first frame panel;
wherein the fully arcuate perimeter of the access aperture is substantially defined in a plane of the generally planar frame panel by perimeters of first and second intersecting ellipses having respective centers which are offset from one another in the plane of the generally planar frame panel,
wherein the fully arcuate perimeter of the access aperture deviates front the perimeters of the first and second intersecting ellipses in extended areas above tops and below bottoms of the perimeters of the first and second intersecting ellipses to provide additional access aperture height.

2. The frame of claim 1, wherein the first and second intersecting ellipses are first and second circles.

3. The frame of claim 1, wherein the fully arcuate perimeter of the access aperture follows portions of the perimeters of the first and second intersecting ellipses and has arcuate transition areas between the perimeters of the first and second intersecting ellipses.

4. The frame of claim 3, wherein the arcuate transition areas provide a continuously curved transition between the perimeters of the first and second intersecting ellipses.

5. The frame of claim 1, wherein the extended areas are aligned with the centers of the first and second intersecting ellipses.

6. The frame of claim 1, and further comprising a cover configured to be removably secured to the first frame panel to provide access through the access aperture.

7. The frame of claim 1, wherein the frame further comprises a chain case, and wherein the volume internal to the first frame panel includes the chain case.

8. The frame of claim 1, wherein the frame further includes a drive motor mount and wherein the volume internal to the first frame panel includes an area around the drive motor mount.

9. The frame of claim 1, wherein the fully arcuate perimeter of the access aperture follows portions of the perimeters of the first and second intersecting ellipses and has arcuate transition areas between the perimeters of the first and second intersecting ellipses to maintain a smooth curvature.

10. A power machine comprising:
a power source;
a traction system powered by the power source; and
a frame supporting the power source and the traction system, the frame having a first generally planar frame panel with a fully arcuate access aperture formed therein to provide access to a volume internal to the first frame panel;
wherein the fully arcuate access aperture has a perimeter substantially defined in the generally planar frame panel by perimeters of first and second intersecting ellipses.

11. The power machine of claim 10, wherein the first and second intersecting ellipses include first and second intersecting circles.

12. The power machine of claim 10, wherein the perimeter of the fully arcuate access aperture follows portions of the perimeters of the first and second intersecting ellipses and has arcuate transition areas between the perimeters of the first and second intersecting ellipses.

13. The power machine of claim 12, wherein the arcuate transition areas provide a continuously curved transition between the perimeters of the first and second intersecting ellipses.

14. The power machine of claim 10, wherein the perimeter of the fully arcuate access aperture deviates from the perimeters of the first and second intersecting ellipses in extended areas above tops and below bottoms of the perimeters of the first and second intersecting ellipses to provide additional access aperture height.

15. The power machine of claim 14, wherein the extended areas are aligned with the centers of the first and second intersecting ellipses.

16. The power machine of claim 10, and further comprising a cover configured to be removably secured to the first frame panel to provide access through the access aperture.

17. The power machine of claim 10, wherein the frame further comprises a chain case, and wherein the volume internal to the first frame panel includes the chain case.

18. A frame for a power machine, the frame comprising:
a first frame panel;
an access aperture formed in the first frame panel to provide access to a volume internal to the first frame panel, the access aperture having a fully arcuate perimeter in the first frame panel;
wherein the fully arcuate perimeter of the access aperture is substantially defined by perimeters of first and second intersecting ellipses having respective centers which are offset from one another;
wherein the fully arcuate perimeter of the access aperture deviates from the perimeters of the first and second intersecting ellipses in extended areas above tops and below bottoms of the perimeters of the first and second intersecting ellipses to provide additional access aperture height.

19. The frame of claim 18, wherein the extended areas are aligned with the centers of the first and second intersecting ellipses.

* * * * *